United States Patent [19]
Moake

[11] Patent Number: 5,272,336
[45] Date of Patent: Dec. 21, 1993

[54] TEMPERATURE CORRECTIONS OF MEASUREMENTS MADE WITH SCINTILLATION DETECTORS

[75] Inventor: Gordon L. Moake, Houston, Tex.
[73] Assignee: Halliburton Logging Services Inc., Houston, Tex.
[21] Appl. No.: 829,093
[22] Filed: Jan. 31, 1992
[51] Int. Cl.⁵ .................. G01V 5/04; G01V 5/00
[52] U.S. Cl. .................. 250/261; 250/262; 250/264
[58] Field of Search .......... 250/252.1 R, 361, 261, 250/262, 256, 264, 265, 370.11, 390.11, 369

[56] References Cited
U.S. PATENT DOCUMENTS

| | | | |
|---|---|---|---|
| 4,199,953 | 4/1980 | Richter, Jr. et al. | 250/261 X |
| 4,394,574 | 7/1983 | Grau et al. | 250/262 |
| 4,423,323 | 12/1983 | Ellis et al. | 250/264 X |
| 4,524,272 | 6/1985 | Scott | 250/262 X |
| 4,661,701 | 4/1987 | Grau | 250/262 X |
| 4,668,863 | 5/1987 | Grau et al. | 250/262 X |
| 4,788,424 | 11/1988 | Preeg | 250/262 X |
| 5,081,351 | 1/1992 | Roscoe et al. | 250/270 |

Primary Examiner—Constantine Hannaher
Assistant Examiner—Edward J. Glick
Attorney, Agent, or Firm—W. J. Beard

[57] ABSTRACT

This disclosure sets out a method for applying a temperature correction to calculations that employ measurements made with scintillation detectors. Temperature measurements are made at or near the scintillation detectors and utilized in corrections employing measurements made with the scintillation detectors to obtain quantities that are relatively independent of temperature.

6 Claims, 2 Drawing Sheets

TEMPERATURE CORRECTIONS OF MEASUREMENTS MADE WITH SCINTILLATION DETECTORS

BACKGROUND OF THE DISCLOSURE

It is well known that logging tools and measurement-while-drilling (MWD) tools, which make measurements while traversing deep well boreholes, encounter large variations in borehole temperatures. In general, temperatures increase with depth, and very high temperatures are frequently encountered.

Many types of logging tools and several types of MWD tools contain scintillation detectors for measuring radiation. These include density tools, natural-gamma tools, carbon-oxygen tools, neutron-gamma porosity tools, and certain types of neutron-neutron porosity tools. Scintillation detectors incorporate scintillators for converting gamma rays or charged particles to light, photomultiplier tubes for converting the light to electronic signals, and electronics for processing the electronic signals. Some scintillation detectors can also detect non-ionizing radiation such as neutrons; they incorporate scintillators that are loaded with a special material, the purpose of which is to convert non-ionizing radiation into ionizing radiation that can be detected by the scintillator. Although all of these detector components are subject to variation with temperature, the present art of electronics is such that the electronics can be designed to be relatively insensitive to temperature within the desired operating range. However, the scintillator and photomultiplier tube are not insensitive to temperature variations which cause large fluctuations in detector response. In order to minimize these source fluctuations, it is common to monitor the output of the detectors with electronics and adjust either the high voltage used to operate the detector or adjust the gain of the electronics to account for these variations. (This is called gain stabilization.) However, these corrections do not account for non-linear variations in the detector response that can cause significant errors when large variations in temperature are encountered.

One of the types of logging tools that employs scintillation detectors is designed to measure formation density. Consider a typical density tool in which cesium-137 bombards the formation with gamma radiation. Two scintillation detectors in the tool respond to the gamma rays returned to the tool by the formation. These detectors, with the aid of associated electronics, convert the gamma rays to electronic pulses of varying amplitude, with higher-amplitude pulses corresponding to higher-energy gamma rays. In a typical application, pulses are grouped into windows according to amplitude (and hence energy), and the number of pulses in each energy window for a particular time interval is determined. However, as the temperature of the detector changes, so do the amplitudes of the pulses. In order to keep the pulses correlated to energy, a small cesium-137 stabilization source is usually positioned near the detector, and energy windows are set up to monitor count rates in energy windows in the vicinity of 662 keV, which is the predominant energy of gamma rays that are emitted from the stabilization source. (Gamma rays that originated in the logging source lose enough energy in the formation that they do not make a large contribution to these windows.) These count rates are monitored to determine the pulse amplitude that corresponds to 662 keV gamma rays. If the amplitude deviates from the nominal value, then the high voltage on the detector is adjusted to keep the amplitude at its nominal level. Since this technique only monitors 662 keV gamma rays, voltages corresponding to other energies may drift due to non-linear variations in the detector or electronics.

Although other tools containing scintillation detectors may use other energies and techniques to stabilize the gain or may not stabilize at all, they are all susceptible to non-linear variations with temperature manifest in the drift in amplitude to different windows.

The present apparatus is therefore summarized as a method and apparatus for making corrections to calculations dependent on pulse amplitude and count using measurements from scintillation detectors (and that includes the affiliated photomultiplier tube and appropriate electronics) to account for both linear and nonlinear temperature variations in the response of the detectors.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENT

Figures 1, 2A, 2B:
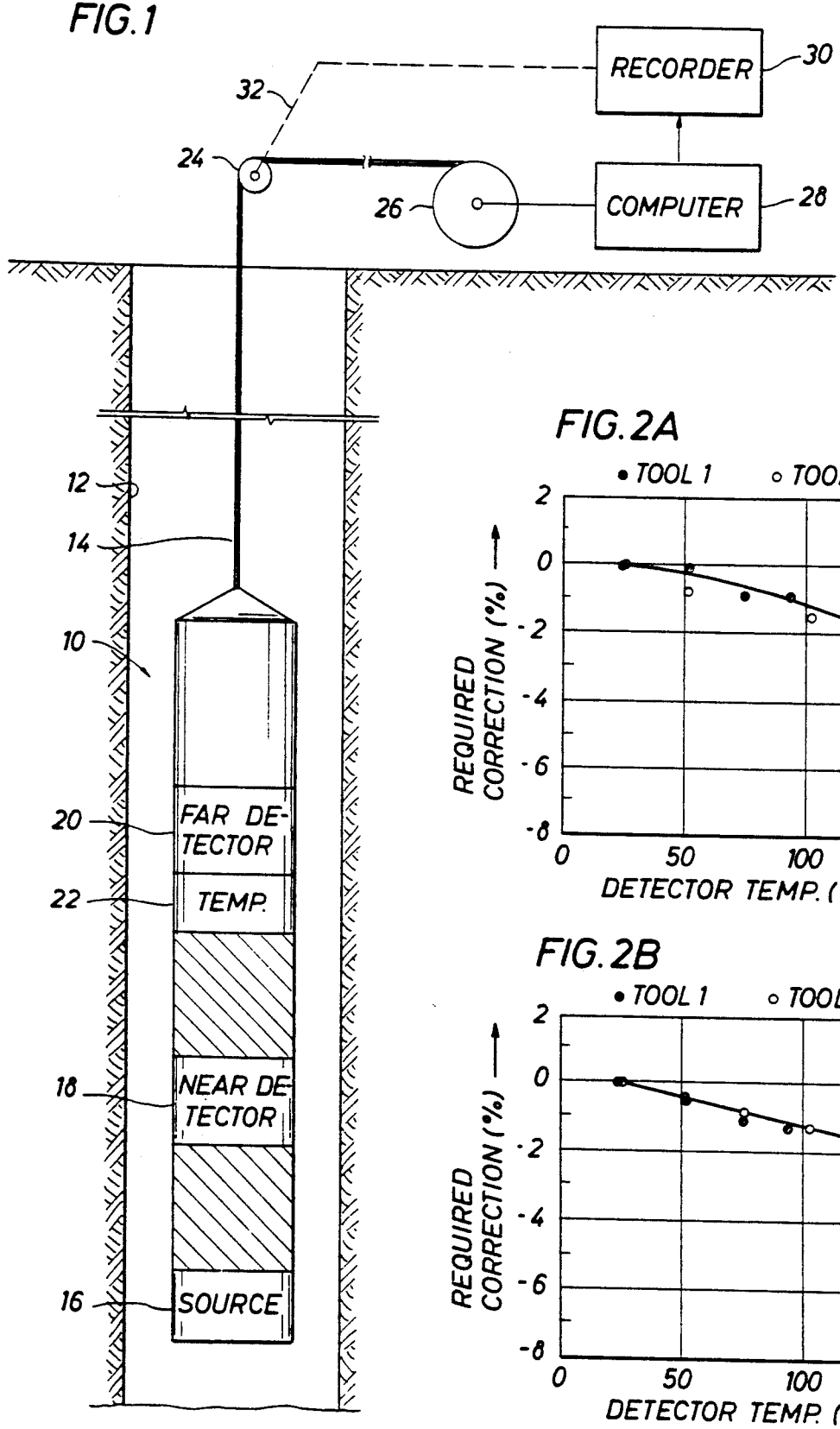
FIG. 1 shows a logging tool suspended in a well borehole for making measurements wherein the tool utilizes a source for irradiation of the adjacent formations and is preferably constructed with near and far detectors for making count determinations, and further showing temperature measuring means installed in the sonde to implement the corrections in accordance with the present disclosure.
Figure 2C:
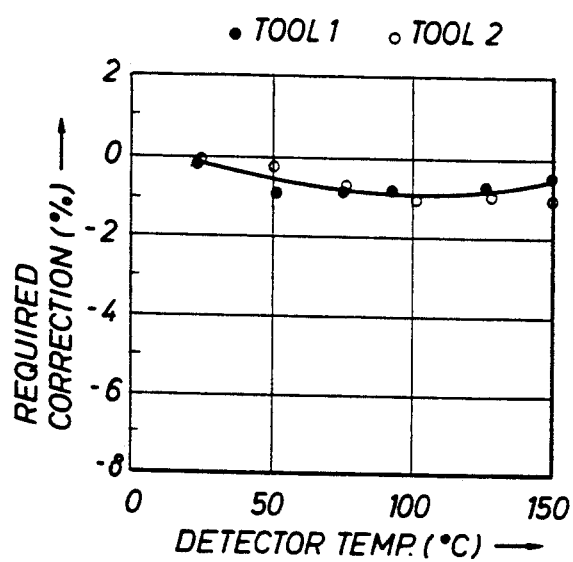
FIGS. 2(A–F) is a set of curves showing typical corrections.
Figure 2D:
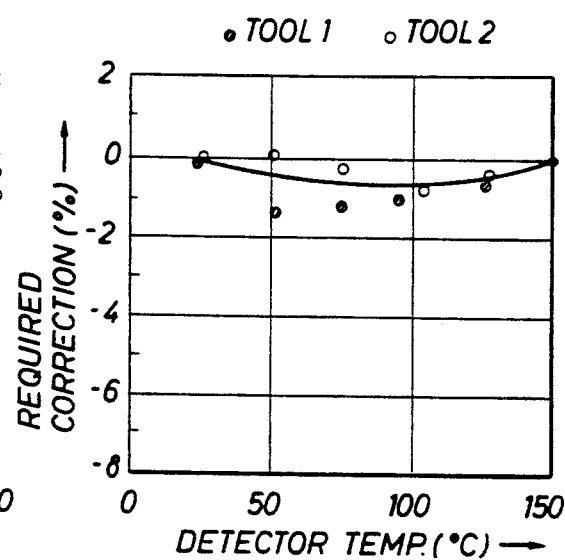
Figure 2E:
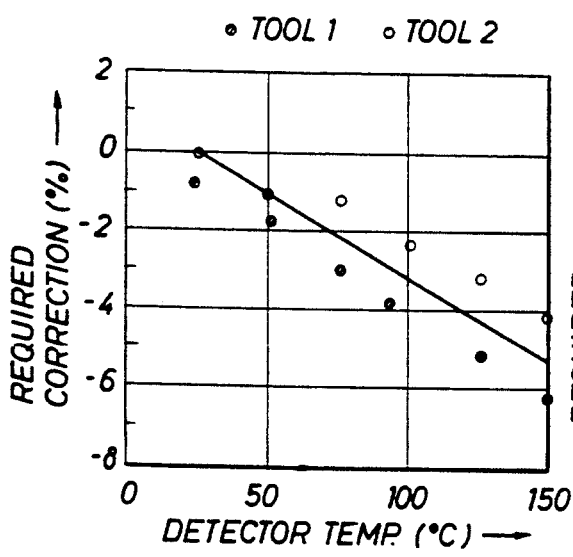
Figure 2F:
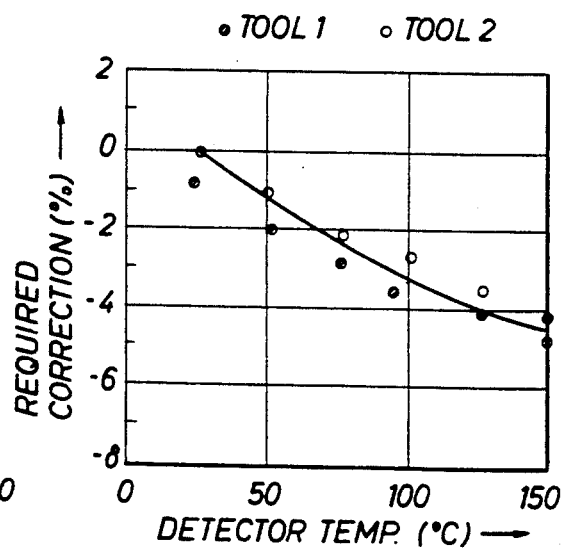

Attention is now directed to FIG. 1 of the drawings where the numeral 10 identifies a sonde reported in a well borehole 12. A sonde generally indicated at 10 incorporates a housing which encloses the equipment within the sonde. It is supported on a logging cable 14 which extends towards the surface as will be described. Within the sonde 10, there is a source of radiation which is identified at 16. A typical source is cesium-137, which provides 662 keV gamma rays that impinge on the adjacent formations. The gamma rays scatter in the formation, thereby losing some of their energy, and some of the gamma rays eventually scatter into the detectors of the tool. These gamma rays are detected by a near detector 18 and a similar but more remote far detector 20. As a generalization, the detectors are identical in construction and differ primarily in their spacing and size of the scintillator. Shielding material typically is placed to prevent direct irradiation from the source 16 to the near detector at 18. The sonde also supports a temperature-measuring sensor 22. That sensor provides an output signal indicative of the prevailing temperature within the sonde so that the temperature corrections of the present disclosure can be implemented.

In typical construction, the detectors 18 and 20 both include a scintillating device that converts the impinging gamma rays into light. That device is normally accompanied by a photomultiplier tube which is affixed to the scintillator for the purpose of converting the resultant light emissions into electronic pulses. The pulses differ in frequency and amplitude, dependent on a number of factors which are well explained elsewhere in the literature. The processing of these signals depends on the usage and the type of technology being employed. In the simplest case, the pulses from each detector are fed into a counter which counts the number of gamma rays sensed by each detector. In a more complicated situation in which some information about the energy of the detected gamma rays is required, the pulses are sorted into ranges of amplitudes and the number of pulses in each range is counted. In a more extreme case, where detailed information on the energy distribution of the detected gamma rays is required, the pulses are sent through an analog-to-digital converter, which determines the height of each pulse and provides the result in digital form. The number of occasions each height is encountered is recorded to yield an energy spectrum of the detected gamma rays. This initial processing and counting is done downhole in the tool, and the results are periodically transferred along the logging cable 14 to the surface where the logging cable passes over a sheave 24. The logging cable is spooled around a drum 26 which holds several thousand feet of logging cable. The downhole results are provided to an appropriately programmed CPU 28, which converts them to count rates. These count rates are then used to compute the desired formation properties such as density and porosity (Pe) and these final values are provided to a recorder 30. The data of interest is recorded as a function of depth of the sonde in the well 12. A depth measuring system 32 is connected from the sheave to provide a measurement of the depth of the sonde.

The present apparatus utilizes the temperature of the detectors in computing the formation properties. The temperature of the detectors is measured by the temperature sensor 22 which is located in the sonde and is preferably immediately adjacent to the detectors. If there is the possibility that the detectors will operate at different temperatures, separate sensors can be placed near each detector. If however the temperature within the sonde housing does not vary much along the interior of the housing, then in that event one temperature will be assumed to prevail at all points within the sonde. Alternatively, calibrations could be made to determine the relationship between the temperature sensor 22 and the actual temperature of the detectors, and this relationship can be taken into account when the calculations are made. In the event that no temperature sensor is available or that the temperature sensor is broken, the temperature can be estimated from the nominal temperature gradient for that area and the measured well depth. However, for simplicity only one temperature sensor is used in the preferred embodiment.

There are many different ways to implement a temperature correction. The best method will depend on the type of measurements and the exact nature of the tool. One method is to first compute the desired formation properties using the tool measurements without applying a temperature correction, and then apply a temperature correction as the last step. This is conceptually simple, but the corrections may be very complex when many count rates or a spectrum are involved in the computations. Another method is to correct each count rate for temperature before the formation properties are computed. In the embodiment of the density tool described above, the relationship between the temperature-corrected count rate $C_{Corr}$ and the measured count rate $C_{Meas}$ is given by $$C_{Corr} = C_{Meas}(1+d), \tag{1}$$

$$d = a_1(T-29) + a_2(T-29)^2, \tag{2}$$

where $a_1$ and $a_2$ are constants, T is the temperature in degrees Celsius, and d is the fractional correction that is required. Of course, other correction equations could be used. If spectra are being used, the shape of the spectrum can be corrected by shifting the channels an amount that depends on the temperature, using a transformation such as $$I_{Corr} = I_{Meas}[1 + b_1(T-29) + b_2(T-29)^2], \tag{3}$$

where I is the channel number and $b_1$ and $b_2$ are constants. Alternatively, if portions of the spectrum are being summed, the channel numbers that define the windows from which the sums are made can be varied as a function of temperature. Regardless of what technique is used, the important point is that the temperature is somehow used in the computations of the formation properties to compensate for the temperature dependence of the measurements.

The impact of this can be readily seen from a study of the temperature response of a density logging tool in the laboratory. In this study, the portion of the tool containing the sensors and temperature-dependent electronics was placed on an aluminum block in an oven. The temperature of the block was monitored and used to account for changes in the block density as its temperature increased. Six count rates from different energy ranges of the two detectors were measured and corrected for temperature variations before being used to compute the density and Pe of the block. The six plots shown in FIGS. 2(A-F) represent the fractional corrections to the count rates that are required to correct for the temperature. The data points represent the response of two different tools, and the solid lines represent the correction that was used in the calculations.

The effects of using a temperature correction in the computation of density and Pe are shown in the table below. The first column gives the temperature measured in the sonde, and is taken to represent the temperature of the detectors. The second column is the temperature of the aluminum block, while the third column lists the true density of the aluminum block at the measured temperature. The fourth column is the density error which is obtained from the uncorrected measurements, and it is seen to be as large as 0.02 g/cc, which is equivalent to 1.2 porosity units and constitutes a significant error. The fifth column shows that the residual error in the density calculation can be reduced by a factor of four or more when the temperature correction is employed. In addition to density, Pe was determined and is reflected in the sixth column. The seventh column shows the error in the Pe calculation can be as large as 0.39 when no temperature correction is used, and column eight shows that a temperature correction can reduce these errors to 0.05 or less.

TABLE I

| Det. Temp. (°C.) | Block Temp. (°C.) | True Density* (g/cc) | Measured Minus True Dens. w/o Temp. Corr. (g/cc) | Measured Minus True Dens. with Temp. Corr. (g/cc) | True Pe* | Measured Minus True Pe w/o Temp. Corr. | Measure Minus True Pe with Temp. Corr |
|---|---|---|---|---|---|---|---|
| 19  | 15  | 2.587 | .000  | .000  | 3.17 | .00  | .00 |
| 26  | 49  | 2.584 | −.007 | −.003 | 3.17 | .01  | .01 |
| 52  | 132 | 2.578 | −.016 | −.003 | 3.17 | −.06 | −.04 |
| 77  | 163 | 2.576 | −.018 | .001  | 3.17 | −.04 | −.03 |
| 95  | 178 | 2.575 | −.024 | −.002 | 3.17 | −.01 | −.01 |
| 125 | 196 | 2.573 | −.023 | .002  | 3.17 | .08  | .00 |
| 149 | 208 | 2.572 | −.020 | .005  | 3.17 | .24  | .02 |
| 173 | 220 | 2.571 | −.023 | −.001 | 3.17 | .39  | .05 |

*The true value at 15° C. if taken as the measured value. The other true values are adjusted from the 15° C. value using the temperature coefficient for thermal explanation of aluminum.

By using the techniques described above, calculations involving measurements with scintillation detectors can be corrected for the temperature dependence of the detectors and associated electronics. This modification of the calculations improves the quality of measurements which are obtained from the tool.

While the foregoing is directed to the preferred embodiment, the scope thereof is determined by the claims which follow.

What is claimed is:

1. A method of correcting for temperature variation calculations made using measurements from a scintillation detector disposed in a well logging tool in a well borehole which penetrates surrounding earth formations and is equipped with a means for measuring temperature comprising the steps:

(a) making measurements of count rate of gamma radiation with the scintillation detector;
   (b) measuring the temperature at said scintillation detector; and
   (c) forming a temperature corrected count rate $C_{Corr}$ dependent on the measured count rate $C_{meas}$ given by:
      (1) $C_{CORR} = C_{Meas}(1+d)$,
      (2) $d = a_1(T-29) + a_2(T-29)^2$
      where $a_1$ and $a_2$ are constants, T is the measured temperature in degrees Celsius, and d is the fractional correction; and
   (d) after making the correction of the foregoing step to the count rate measurements from said scintillation detector, determining earth formation properties as a function of the corrected count rate measurements from said scintillation detector.

2. The method of claim 1 wherein the temperature is determined from one or more temperature sensors in said well logging tool in the immediate vicinity of said detector.

3. A method of correcting for temperature variation calculations made using measurements from plural scintillation detectors disposed in a well logging tool in a well borehole which penetrates surrounding earth formations and is equipped with plural means for measuring temperature at the plural detectors, comprising the steps of:

(a) making measurements of count rates of gamma radiation with the scintillation detectors;
   (b) measuring the temperature at each of said scintillation detectors;
   (c) forming a temperature corrected count rate $C_{CORR}$ dependent on the measured count rate $C_{MEAS}$ at each of said detectors given by:
      (1) $C_{CORR} = C_{MEAS}(1+d)$
      (2) $d = a_1(T-29) + a_2(T-29)^2$
      where $a_1$ and $a_2$ are constants, T is the measured temperature in degrees Celsius and d is the fractional correction; and
   (d) after making the corrections of the foregoing step to the count rate measurements from said scintillation detectors, determining earth formation properties as a function of the corrected count rate measurements from said plural scintillation detectors.

4. A method of correcting for temperature variation calculations made using measurements from a scintillation detector disposed in a well logging tool in a well borehole which penetrates surrounding earth formations and is equipped with a means for measuring temperature comprising the steps of:

(a) making measurements of count rate of gamma radiation with a scintillation detector;
   (b) measuring the temperature T at said scintillation detector;
   (c) separating the total count rate measurement of gamma rays detected into an energy spectrum having N channels of count rate measurement as a function of energy $I_{meas}(N)$ where N is an integer and the N channels span the energy range of gamma rays from 0 to about 8 Mev;
   (d) forming a temperature corrected count rate $I_{corr}$ dependent on the measured count rate $I_{meas}$ in each channel of said N channels given by:

$$I_{CORR} = I_{MEAS}[1 + b_1(T-29) + b_2(T-29)^2]$$

where I is the count rate in channel number N and $b_1$ and $b_2$ are constants; and
   (e) after making the correction of the foregoing step to the measurements from the scintillation detector determining such formation properties as a function of the corrected count rate $I_{corr}$ energy spectrum measurements from the scintillation detector.

5. The method of claim 4 wherein the temperature is determined from one or more temperature sensors in said logging tool in the immediate vicinity of said detector.

6. A method of correcting for temperature variation calculations made using measurements from plural scintillation detectors disposed in a well logging tool in a well borehole which penetrates surrounding earth formations and is equipped with plural means for measuring temperature at each of said plural scintillation detectors, comprising the steps of:

(a) making measurement of total count rate of gamma radiation with each of said plural scintillation detectors;
(b) measuring the temperature T at each of said scintillation detectors;
(c) separating the total count rate measurement of gamma rays at each of said detectors into plural gamma energy spectra, each such energy spectrum having N channels of count rate measurements $I_{MEAS}$ (N) as a function of the energy of gamma rays impinging on that particular detector, where N is an integer and the N channels span the energy range of gamma rays from 0 to about 8 Mev;
(d) forming a temperature corrected count rate $I_{CORR}$ dependent on the measured count rate $I_{MEAS}$ in each channel of said N channels in each of said plural gamma ray energy spectra, given by:

$$I_{CORR} = I_{MEAS}[1 + b_1(T\text{-}29) + b_2(T\text{-}29)^2]$$

where I is the count rate in channel number N and $b_1$ and $b_2$ are constants; and
(e) after making the corrections of the foregoing steps to the energy spectra measurements from each of the scintillation detectors, determining earth formation properties as a function of the corrected count rate energy spectra measurements $I_{CORR}$ from each of said plural scintillation detectors.

* * * * *